Jan. 20, 1925.

A. V. SIMS 1,523,910

VALVE

Filed Dec. 28, 1916   2 Sheets-Sheet 1

Alfred V. Sims  Inventor
By his Attorney
Thomas Howe

Jan. 20, 1925.

A. V. SIMS

VALVE

Filed Dec. 28, 1916

Alfred V. Sims Inventor

By his Attorney

Thomas Howe

Patented Jan. 20, 1925.

1,523,910

UNITED STATES PATENT OFFICE.

ALFRED V. SIMS, OF NEW YORK, N. Y.

VALVE.

Application filed December 28, 1916. Serial No. 139,236.

*To all whom it may concern:*

Be it known that I, ALFRED V. SIMS, a citizen of the United States, residing at New York city, county of New York, and State of New York, have invented new and useful Improvements in Valves, of which the following is a specification.

This invention relates to valve structures, and more particularly it relates to such structures wherein the valve is lifted from its seat by fluid pressure and is returned to its seat when the opening pressure is removed.

One object of the invention is to provide a structure through which the fluid will pass with a minimum expenditure of energy. This is accomplished by so directing the fluid as to reduce to a minimum the resistance opposing it while it is passing through the valve seat, thereby conserving and economizing the energy expended in the forcing of the fluid through the valve mechanism. To attain this object of the invention, the vertical component of the fluid forces acting against the valve is reduced and the valve mechanism is constructed so that the fluid flows smoothly through the mechanism, the components of resistance acting against it being eliminated to a large extent. Furthermore the reduction of the vertical component of the fluid force acting against the bottom of the valve operates to reduce the impact of the valve closure, thus decreasing the liability to breakage and other damaging effects as well as the pounding noise of operation. The reduction of energy necessary to effect passage of the fluid through the valve structure as above referred to, in other words, the increase in efficiency of the mechanism as a fluid transmission device, is effected by the shape and inclinations of the walls of the fluid passages and consequently the shape and inclinations of the surfaces of the ribs extending between the hub and rim of the valve seat. These cross-sections are made such that the lines bounding them and which lie in the walls of the water passages are straight. The fluid may thus flow more directly from one side of the valve to the other, so that although no two laterally adjacent elemental columns of fluid travel in parallel lines, yet no elemental column is deflected from its course by the ribs during its passage through the valve seat. This results in a reduction of the liability to frictional and eddy losses from that which would obtain if the transverse sections of the ribs were curvilinear, in which case the fluid passages would be formed of curved elemental lines with the defects as referred to. In my improved valve seat preferably the sections nearest the rim are longest and make the smallest angle with the plane of the seat of the valve while those nearest the hub are shortest and make the greatest angle with the plane of the valve seat. This may be accomplished by making the ribs so that their surfaces presented to the fluid passages are warped surfaces generated by straight lines as will be hereinafter again referred to. With this construction, that is, with the surfaces of the ribs making greater angles with the valve seat plane adjacent to the hub than adjacent to the rim, and bearing in mind that the elemental columns of fluid passing through the valve are actuated by forces tending to produce like velocities, those columns nearest the hub more quickly impinge against the under surface of the valve and are deflected outwardly against the elemental columns more remote from the hub, thus causing them to take a resultant motion in the direction of a shorter and smoother path through the valve mechanism than if they impinged directly against the valve and were abruptly turned to one side as would be the case if the deflecting influence mentioned were not present. The fluid thus passes through the valve structure without the formation of swirls and spaces of negative pressures near the hub. With the elemental columns making acute angles with the valve or disk, it follows that a greater velocity of the passing fluid is required in order that the resultant vertical component of the force against the valve may produce a given lifting effect than would be the case if these columns were vertical, and since the discharge through the structure in a given time is proportional to the velocity of the passing fluid and to the area of the opening, it follows that for a given lifting of the valve the greater velocity, such as is produced by least confusion of elemental columns (which is the result of the straight line passage of elemental columns of fluid as before referred to as distinguished from curvilinear paths produced by ribs curvilinear in cross-section), will result in a greater volume of fluid passing for a given expenditure of energy and with a proportionate resultant efficiency of operation.

A further object of the invention is to provide a valve structure wherein the valves will be turned or rotated at each operation so that it will be reseated in a different position with relation to the seat from that which it occupied previously. The purpose of thus turning the valve is to prevent the valve and seat from always occupying the same position with relation to each other otherwise irregularities in the surfaces being always directed against the same portions, are liable to cause irregular wear, leakage and slip. The rotation of the valve, however, brings new points of the valve and seat in juxta-position so that the wear is uniformly distributed. According to the present invention an improved means for accomplishing rotation of the valve about its axis is provided, this rotation being effected without regard to any turning effect which the fluid passing through the seat may exert on the valve, so that it is immaterial whether such turning effect is present or not, or in which direction it is exerted. This is of importance because, among other things, it permits the valve seat to be designed for greatest efficiency as a fluid transmitter or for eliminating pound or both, the design not being hampered by the necessity of providing a valve turning component.

A further object of the invention is to provide cushioning means between the movable mechanism of the valve structure and the seat construction.

A further object of the invention is to provide a seat structure with an enlarged and more efficient port area.

A further object of the invention is to provide improved bearing surfaces for wrenches so that liability to injuring the valve seat during its installation is greatly lessened.

Other and ancillary objects of the invention will appear hereinafter.

In the accompanying drawings which illustrate the invention,

Figure 1:
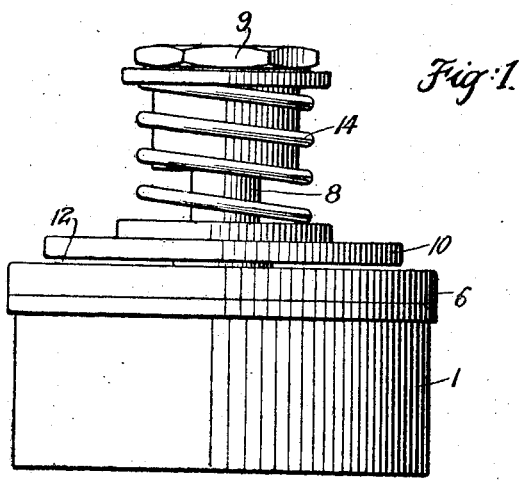
Fig. 1 is a side elevation of a valve embodying the invention.

Referring to the drawings, and first to Figs. 1 to 4 inclusive, the valve-seat structure comprises a rim 1 and a central hub 2 secured together by ribs 3, the upper faces 4 of the rim and 5 of the hub forming a seat for the valve. The valve disk 6 adapted to co-operate with the valve seat may be of suitable material such as hard rubber which is preferably reinforced as by a flat, annular, metal ring 7 embedded in it. This reinforcement has a peculiar effectiveness in the structure shown for the reason as will hereinafter appear, that the valve disk is, when in closed position subjected to fluid pressure without the protecting influence of the guard plate. Mounted upon the hub 2 of the seat structure, as by screwing thereinto, is a central post or stem 8 carrying the head 9. Mounted to easily slide upon the stem 8 is the metal guard plate 10. The central hub or boss 11 of the guard plate extends through a central aperture in the valve disk and rests upon the hub of the valve seat structure, the proportions being such that when the valve disk is on its seat the guard plate 10 is held slightly elevated so as to form a clearance 12 between the bottom of the guard plate and the valve disk. On the under side of the guard plate are cut channels or grooves 13 making angles with radii of the plate so that when fluid is forced along them a component circumferential of the plate and valve will be produced. A spring 14 interposed between the head 9 and the guard plate tends to force the guard plate toward the valve disk and seat.

It will be observed that portions of the hubs 2 and 11 are made to telescope with each other by counter sinking the hub 2 at 15, the bottom of the hub 11 projecting into the space thus formed with easy clearance. The object of this is to cushion the moving parts when the valve closes. The recess in one member will, while the valve is lifted, fill with fluid which will be pocketed by the entering projection of the co-operating member, the two members being then permitted to slowly come together as the fluid oozes out through the clearance between the parts. Obviously the retarding effect thus produced will depend upon the amount of clearance between the parts. Where it is not considered necessary to cushion the impact, cushioning means may be omitted, the end of the hub on the guard plate coming against the plane upper face of the seat hub.

The ribs 3 have warped surfaces of rectilinear transverse section, that is to say the sections are bounded by straight lines at those sides forming the walls of the fluid passages through the valve structure. Such walls are generated by straight lines, as generators, moving in contact with lines either straight or curved, as directrices. Thus in the structure shown in Fig. 4, one surface of a vane is generated by a straight line moving along the curved line 16 at the top of the valve seat as one directrix and along a straight line 17 at the bottom of the valve seat structure as the other directrix. The manner of generating the surface is shown by the diagram of Fig. 5 wherein 18 represents a straight line in the successive positions which it occupies in moving along the directrices to form the warped surface. Similarly the opposite surface of the rib may be generated by a straight line moving along the curved line 19 at the top of the seat and the straight line 20 at the bottom of the seat structure. It will be seen that in the structure shown, the two directrices of a rib, as the curved line 16 and the straight line 17 are upon the same side of the hub of the valve seat. That is to say, the points at which the upper and lower directors join the hub, as by intersecting, or merging with or being tangent thereto, lie within the semicircle of the seat which contains the rib of said directors. It will further be observed that the directrices are not radial, i. e. the straight line and the chord of the curved line do not pass through the axis of the seat but to one side thereof.

Figure 2:
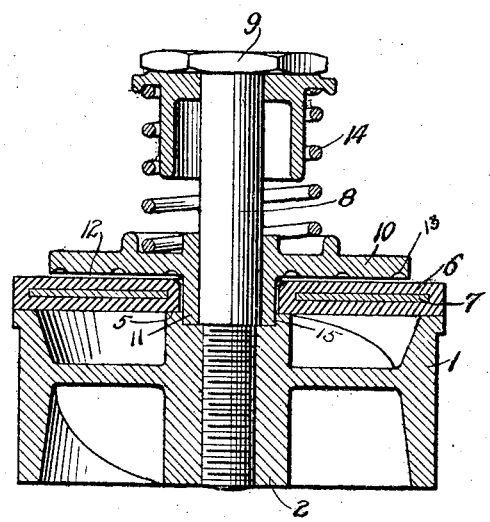
Fig. 2 is a vertical central section on the line 3—3 of Fig. 4.
Figure 3:
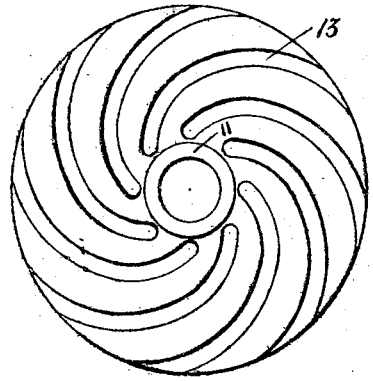
Fig. 3 is a bottom plan view of the guard plate.
Figure 4:
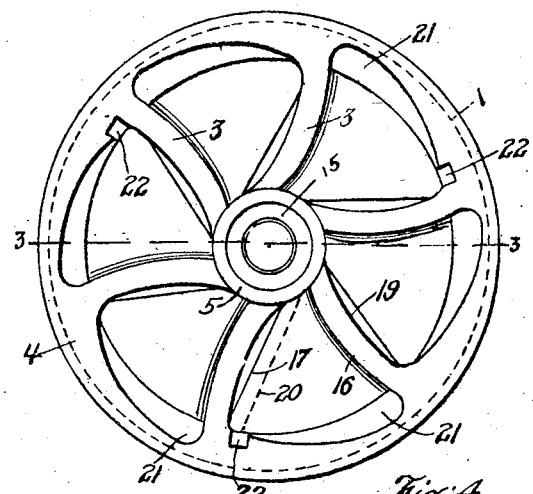
Fig. 4 is a top plan view of the seat structure.
Figure 5:
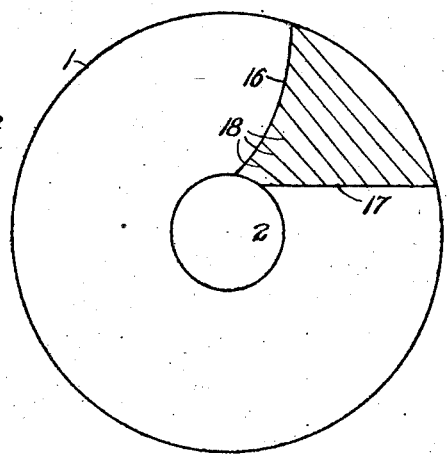
Fig. 5 is a diagram showing the manner of generating the surfaces of the ribs between the hub and rim of the valve seat.

A smoother flow of water and increase of port area is obtained by cutting out or forming recesses in the otherwise circular rim of the valve seat at the top between the successive ribs as shown at 21, this cut away portion being the greatest just back of each rib where it joins the top of the rim and tapering circumferentially as shown in Fig.
4. Also this cut away portion tapers downwardly as shown in Fig. 2. Distributed about the top of the rim, preferably at the thicker portions thereof and at the inside of the rim, are recesses 22 adapted to receive the projections of a wrench in turning the valve. This provides a reliable means whereby the valve seat may be turned in either direction, in installing or demounting it, without danger of injuring the structure. Without a wrench hold provided on the rim the only parts which would afford a hold would be the ribs which are liable to be distorted or broken by such use, and furthermore, when the ribs are inclined, they provide a hold for but one direction of turning on one side of the seat.

As shown in the drawings the valve is closed and under such circumstances the clearance 12, including the vanes in the guard plate, will be filled with fluid. As soon as there is sufficient unbalanced pressure upon the under side of the valve disk the valve will be forced upwardly. This will result in the squeezing out of the fluid between the valve disk and the guard plate, the vanes of the guard plate giving a circumferential turning to the fluid. It will be observed that from the time of lifting the valve until it comes in contact with the guard plate the valve disk will be fluid borne so that it is easily turned by the turning effect exerted upon it by the fluid flowing outwardly between the disk and guard plate, which is given a tangential component by the grooves or vanes of the guard plate. It will be observed that between the hub of the guard plate and the valve disk is a small clearance. The distance which the valve moves from its seat before coming in contact with the guard plate is very small in most cases not over one-sixteenth of an inch, but in this short movement it is rotated sufficiently, a movement of one-hundredth of an inch on the seat of a valve of ordinary size being sufficient. In this small movement of the valve however, during which turning takes place and which occupies a short space of time, the valve opening is not sufficient to permit the fluid through the valve ports to acquire sufficient velocity to have any appreciable effect upon the turning of the valve and consequently this turning is dependent upon the action of the fluid between the valve and guard plate as before referred to.

The valve disk having come against the guard plate its turning movement ceases and its further upward movement operates to compress the spring 14 until the upper limit of movement of the valve has been reached. As soon as the pressure on the seat side of the valve has been sufficiently reduced, the guard plate and disk will be returned towards the seat. The guard plate will come to rest, separated from the valve, being cushioned in its impact as already described, while the fluid pressure will force the valve disk against its seat. This completes a cycle of opening and closing of the valve and may be repeated indefinitely.

Figure 6:
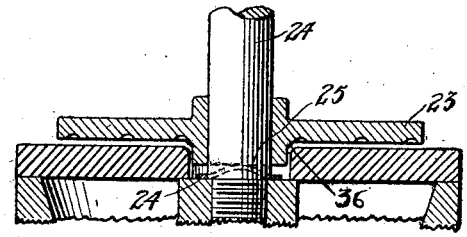
Figs. 6 and 7 are fragmentary sections showing modified structures of the cushioning means between the movable portions of the valve structure and the portion against which it abuts; and, Fig. 8 is a sectional view, partly broken away, of a modification in which the guard plate is supported by the stem.

Referring to Fig. 6, the impact of the guard plate 23 against the seat 24 is arrested by a washer 25 which is bent as shown, this washer resting upon the valve seat and adapted to receive the hub of the guard plate as it moves into closed position. The resistance to the guard plate is afforded not only by the spring of the metal of the washer but by reason of the washer being bent and a small clearance is formed between the washer and valve seat. The washer therefore can only give way to the impact of the guard plate as the fluid which has collected between the washer and the valve seat oozes therefrom. An action something like a dash-pot action is thus afforded.

Figure 7:
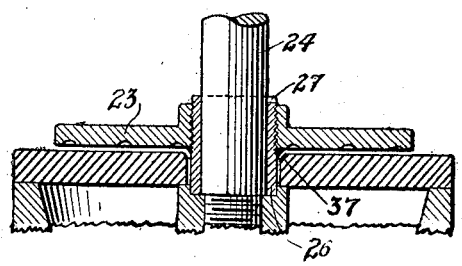

The guard plate supporting member as shown in Fig. 7 is similar to that shown in Fig. 2 except that it is made adjustable to accommodate different thicknesses of valve disk or to regulate the clearance between the valve disk and the guard plate. To this end it will be seen that the central supporting member of the guard plate is a sleeve 26 which is screw-threaded in the center of the guard plate and at its lower end bears upon the valve seat so that the guard plate is supported thereby. By turning the sleeve 26 in any suitable manner, as by means of inserting wrench prongs in the recesses 27, the sleeve may be turned and thereby advanced or withdrawn. In this manner the sleeve may be made to project a greater or less extent from the bottom of the guard plate and so the height at which the guard plate is held above the seat may be regulated.

Since in fluid rotated valves the wearing on the sides of the holes through the valves has a tendency to make the holes more and more oblong there have been provided conical projections 36 on the guard plate, here shown as fillets between the guard plate 23 and the guard plate hub 26, which engage with the chamfered edge 37 of the hole in the valve. The function of this feature is to cause the valve to be truly centered with each stroke or cycle of the valve.

Figure 8:
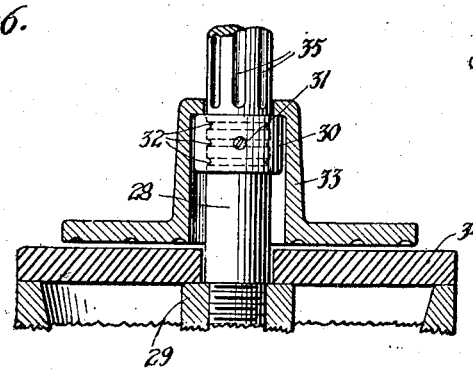

Referring now to Fig. 8, the stem 28 supported from the hub of the valve seat 29 carries upon it a collar 30 which is secured in position by means of a set-screw 31 entering into any one of the circumferential grooves 32 in the stem, the adjustment of the collar as to height above the valve seat being dependent on which one of the grooves the set-screw enters. The guard plate is supported by a central thimble 33, the upper edges of which engage the collar 30 to support the guard plate which slides upon the stem. The reason for providing the thimble is to permit the elevation of the stop collar 30 a sufficient distance upon the stem so as to avoid interference with the opening movement of the valve disk 34. In the stem are cut longitudinal slots 35 which extend to within a short distance of the collar 30. The thimble makes a running fit about the stem and has a small clearance between it and the collar 30. When, therefore, the guard plate is raised on the opening of the valve, fluid may enter through the grooves 35 into the recess bounded by the thimble, stem and collar 30. As the guard plate descends the fluid may flow out through the grooves 35 until at a point near the end of its downward travel the ends of the grooves 35 are reached. The fluid is then pocketed between the thimble, stem and collar and can only escape between the lateral sides of the collar and stem, and the thimble. This takes place slowly and so cushions the impact of the guard plate in coming against its stop.

While the invention has been illustrated in what are considered its best applications, it may have other embodiments without departing from its spirit and so is not limited to the structures shown in the drawings.

What I claim is:—

1. The combination with a reciprocating and fluid rotated valve, of a spring backing for the valve on which the valve is free to rotate and means for permitting water to enter between the backing and the valve upon the closing of the valve to form a liquid bearing for the rotating valve.

2. A valve seat having a hub and a rim, of ribs extending between the said hub and rim, said ribs having rectilinear warped surfaces each generated by a line maintained substantially parallel to a given plane and rectilinear transverse sections.

3. The combination with a valve seat of a reciprocatable and rotatable valve adapted to co-operate therewith, a reciprocating guard plate for said valve, and means for supporting said guard plate out of contact with said valve when the valve is closed.

4. The combination with a valve seat of a reciprocatable and rotatable valve disk and a reciprocating guard plate, a hub or sleeve at the central part of the guard plate, said hub extending through said disk and bearing against the seat to support said plate out of contact with the disk.

5. The combination with a valve seat of a reciprocatable and rotatable valve adapted to co-operate therewith, a reciprocating guard plate for said valve, and means for supporting said guard plate out of contact with said valve when the valve is closed, and means for cushioning the impact of the guard plate on closing of the valve.

6. The combination with a valve seat of a reciprocatabe and rotatable valve adapted to co-operate therewith, a reciprocating guard plate for said valve, and means for supporting said guard plate out of contact with said valve when the valve is closed, and means for causing the fluid expelled from between the said valve and guard plate to exert a turning force on the valve as the valve and guard plate are moved together in opening the valve.

7. The combination with a valve seat of a reciprocatable and rotatable valve adapted to co-operate therewith, a reciprocating guard plate for said valve, and means for supporting said guard plate out of contact with said valve when the valve is closed, said guard plate having channels therein forming angles with radii of the plate.

8. The combination with a valve seat of a reciprocatable and rotatable valve adapted to co-operate therewith, a reciprocating guard plate for said valve and adjustable means for supporting said guard plate out of contact with said valve when the valve is closed.

9. The combination with a valve seat of a valve disk therefor, comprising elastic material containing a reinforcement of another material, a guard plate, and means for supporting said guard plate out of contact with said valve when the valve is closed.

10. The combination with a valve seat having a hub, a rim, and inclined ribs between said hub and rim, of a reciprocatable and rotatable valve co-operating with said seat, a reciprocating guard plate for the valve, means for supporting said guard plate out of contact with said valve when the valve is closed and means for causing the fluid between the guard plate and valve to exert a turning effect upon the valve when the said plate and valve are moved toward each other.

11. The combination with a valve seat of a reciprocating valve co-operating therewith, said valve seat comprising a hub, a rim, and ribs between the said hub and rim, each of the said ribs having a warped surface generated by a straight line as generatrix said line being substantially parallel to the fluid stream and with one of the two directrices being a straight line.

12. The combination with a valve seat of a reciprocating valve co-operating therewith, said valve seat comprising a hub, a rim and ribs between the said hub and rim, each of the said ribs having a warped surface generated by a straight line as a generatrix said line being substantially parallel to the fluid stream and with one of the two directrices being a curved line.

13. The combination with a valve seat of a reciprocating valve co-operating therewith, said valve seat comprising a hub, a rim and ribs between the said hub and rim, each of the said ribs having a warped surface generated by a straight line as generatrix said line being substantially parallel to the fluid stream and one of the directrices being a straight line and the other a curved line.

14. The combination with a valve seat of a reciprocating valve co-operating therewith, said valve seat comprising a hub, a rim and ribs between the said hub and rim, each of said ribs having a warped surface generated by a straight line as generatrix, said line being substantialy parallel to the fluid stream, the two directrices being on the same side of the hub.

15. The combination with a valve seat of a reciprocating valve co-operating therewith, said valve seat comprising a hub, a rim and ribs between the said hub and rim, each of the said ribs having a warped surface generated by a straight line as generatrix, said line being substantially parallel to the fluid stream, one of the directrices passing substantially to one side of the axis of the seat, that is, being non-radial.

16. The combination with a valve seat of a reciprocating valve co-operating therewith, said valve seat comprising a hub, a rim and ribs between the said hub and rim, each of the said ribs having a warped surface generated by a straight line as generatrix, said line being substantially parallel to the fluid stream, and the directrices passing substantially aside from the axis of the hub, that is being non-radial.

17. The combination with a valve seat of a reciprocating valve, a stationary guide for said valve, there being a clearance between said valve and guide and means for centering the valve with relation to the seat.

18. The combination with a valve seat, of a reciprocating and rotating valve disk, a reciprocating guard plate and a stem extending through said disc and plate, said plate and disk being relatively movable and said plate having a projection engaging said valve to center it.

19. The combination with a valve seat of a stem extending therefrom; a valve disc and a guard plate mounted to reciprocate on said stem, said guard plate having a hub or sleeve extending into the disc to form a bearing on the stem as a guide for said guard plate.

20. A valve seat having a hub and rim of ribs extending between the said hub and rim; each of said ribs having a warped surface generated by a straight line maintained substantially parallel to a given plane.

In testimony whereof I have signed this specification this 26th day of December, 1916.

ALFRED V. SIMS.